United States Patent
Shinoda et al.

(10) Patent No.: US 12,197,013 B2
(45) Date of Patent: Jan. 14, 2025

(54) OPTICAL FIBER PITCH CONVERSION JIG, OPTICAL CONNECTOR, PITCH CONVERSION CORD, OPTICAL CONVERSION BOX, AND PITCH CONVERSION METHOD FOR OPTICAL FIBERS

(71) Applicant: Fujikura Ltd., Tokyo (JP)

(72) Inventors: Tomoyuki Shinoda, Sakura (JP); Masayuki Hirose, Sakura (JP); Takaaki Ishikawa, Sakura (JP); Shigeo Takahashi, Sakura (JP)

(73) Assignee: Fujikura Ltd., Tokyo (JP)

(*) Notice: Subject to any disclaimer, the term of this patent is extended or adjusted under 35 U.S.C. 154(b) by 302 days.

(21) Appl. No.: 17/762,161

(22) PCT Filed: Nov. 9, 2020

(86) PCT No.: PCT/JP2020/041720
§ 371 (c)(1),
(2) Date: Mar. 21, 2022

(87) PCT Pub. No.: WO2021/157150
PCT Pub. Date: Aug. 12, 2021

(65) Prior Publication Data
US 2022/0373743 A1 Nov. 24, 2022

(30) Foreign Application Priority Data
Feb. 7, 2020 (JP) .................................. 2020-019960

(51) Int. Cl.
*G02B 6/36* (2006.01)
*G02B 6/38* (2006.01)

(52) U.S. Cl.
CPC ........... *G02B 6/368* (2013.01); *G02B 6/3636* (2013.01); *G02B 6/3825* (2013.01); *G02B 6/3833* (2013.01)

(58) Field of Classification Search
CPC ...... G02B 6/36; G02B 6/3636; G02B 6/3825; G02B 6/3833
See application file for complete search history.

(56) References Cited

U.S. PATENT DOCUMENTS 4,923,275 A * 5/1990 Kaukeinen ............... G02B 6/06
385/115
5,425,118 A * 6/1995 Sugihara ............... G02B 6/3839
385/59
(Continued)

FOREIGN PATENT DOCUMENTS

JP 63-041105 U 3/1988
JP H07-270639 A 10/1995
(Continued)

OTHER PUBLICATIONS

International Search Report issued in corresponding International Application No. PCT/JP2020/041720 mailed Jan. 12, 2021 (3 pages).

*Primary Examiner* — Tina M Wong
(74) *Attorney, Agent, or Firm* — Osha Bergman Watanabe & Burton LLP

(57) ABSTRACT

An optical fiber pitch conversion jig for converting a pitch among optical fibers by inserting the optical fibers from a first end of the optical fiber pitch conversion jig and making the optical fibers protrude from a second end of the optical fiber pitch conversion jig, the optical fiber pitch conversion jig includes: a groove portion including grooves extending from the first end to the second end, a first linear part on a side closer to the first end and in which a pitch among the grooves is a first pitch, and a pitch change part that is
(Continued)

continuous with the first linear part and in which the pitch widens to a second pitch larger than the first pitch. In the pitch change part, at least one of the grooves is curved.

14 Claims, 13 Drawing Sheets

(56) References Cited

U.S. PATENT DOCUMENTS

| | | |
|---|---|---|
| 6,295,400 B1 | 9/2001 | Shahid |
| 6,754,428 B1* | 6/2004 | Brown ................ G02B 6/3636 385/83 |
| 2004/0114874 A1* | 6/2004 | Bono ................ G02B 6/4472 385/53 |
| 2011/0075973 A1* | 3/2011 | Dean, Jr. .......... B29D 11/00663 264/1.25 |
| 2015/0062956 A1* | 3/2015 | Genier ................ G02B 6/0008 362/554 |
| 2015/0063766 A1 | 3/2015 | Chen |
| 2019/0250335 A1* | 8/2019 | Kulick .................... G02B 6/43 |

FOREIGN PATENT DOCUMENTS

| | | |
|---|---|---|
| JP | 2003172855 A | 6/2003 |
| JP | 2004302425 A | 10/2004 |
| JP | 2005-309259 A | 11/2005 |
| JP | 2006126285 A | 5/2006 |
| JP | 2007-041222 A | 2/2007 |
| JP | 2019-113730 A | 7/2019 |
| JP | 2019-159057 A | 9/2019 |

* cited by examiner

OPTICAL FIBER PITCH CONVERSION JIG, OPTICAL CONNECTOR, PITCH CONVERSION CORD, OPTICAL CONVERSION BOX, AND PITCH CONVERSION METHOD FOR OPTICAL FIBERS

TECHNICAL FIELD

The present invention relates to an optical fiber pitch conversion jig. Further, an optical connector or the like provided with this optical fiber pitch conversion jig will also be referred to.

Priority is claimed on Japanese Patent Application No. 2020-019960, filed Feb. 7, 2020, the content of which is incorporated herein by reference.

BACKGROUND

Networks using optical fibers are widely used.

The scale of networks continues to grow, and there is an increasing demand for multi-core (high density) cables and cords that use optical fibers.

As one of the means of multi-core, it is conceivable to reduce the interval (pitch) of a plurality of optical fibers disposed side by side, but considering the connection with the existing network, pitch conversion techniques may be required to connect the same number of optical fibers disposed at different pitches.

In this regard, Patent Document 1 discloses a method for manufacture an optical fiber assembly in which a plurality of optical fibers are aligned at a predetermined pitch. In this method, the pitch of the plurality of optical fibers is adjusted to a predetermined value by passing the plurality of optical fibers through an alignment member formed by arranging the plurality of through holes.

PATENT LITERATURE

[Patent Document 1]
Japanese Unexamined Patent Application, First Publication No. 2019-113730

The through hole of the alignment member described in Patent Document 1 is linear, and the pitch of the entrance of the through hole is already a predetermined value. Therefore, manufacturing an optical fiber assembly by using a plurality of optical fibers that are not connected to each other may be implemented. But for example, if it is used in the case of converting the pitch of a ribbon-shaped cable in which a plurality of optical fibers are connected at a pitch different from a predetermined value to a predetermined value, the work becomes complicated.

SUMMARY

One or more embodiments of the present invention provide an optical fiber pitch conversion jig capable of easily converting the pitch of a plurality of connected optical fibers.

According to one or more embodiments, an optical fiber pitch conversion jig for converting a pitch among a plurality of optical fibers includes: a groove portion formed by arranging a plurality of grooves extending from a first end of the optical fiber pitch conversion jig to a second end of the optical fiber pitch conversion jig, in which the plurality of grooves include: a linear part which is provided on a side closer to the first end and in which a pitch among the plurality of grooves is a first pitch; and a pitch change part which is continuous with the linear part, and in which the pitch widens to a second pitch larger than the first pitch, in the pitch change part, at least one groove among the plurality of grooves is curved, and the pitch among the plurality of optical fibers is converted by inserting the plurality of optical fibers from the first end and making the plurality of optical fibers protrude from the second end.

The optical connector according to one or more embodiments of the present invention includes the optical fiber pitch conversion jig according to one or more embodiments.

A pitch conversion cord according to one or more embodiments of the present invention includes the optical fiber pitch conversion jig according to one or more embodiments.

An optical conversion box according to one or more embodiments of the present invention includes the pitch conversion cord according to one or more embodiments.

A pitch conversion method for optical fibers according to one or more embodiments of the present invention, includes, by using the optical fiber pitch conversion jig, inserting the plurality of optical fibers arranged at the first pitch into the groove portion from a side closer to the first end along the exposed linear part, and converting the first pitch into the second pitch, by pushing the plurality of optical fibers to pass through the pitch change part.

Another method of the above pitch conversion method includes covering the plurality of grooves located between the first covering part and the second covering part with a lid member (i.e., "lid"), inserting the plurality of optical fibers arranged at the first pitch into the groove portion from a side closer to the first end, and converting the first pitch into the second pitch, by pushing the plurality of optical fibers to pass through the pitch change part.

According to the present invention, the pitch of a plurality of connected optical fibers can be easily converted.

DETAILED DESCRIPTION

First Example

One or more embodiments of the present invention will be described with reference to FIGS. 1 to 8.

Figure 1:
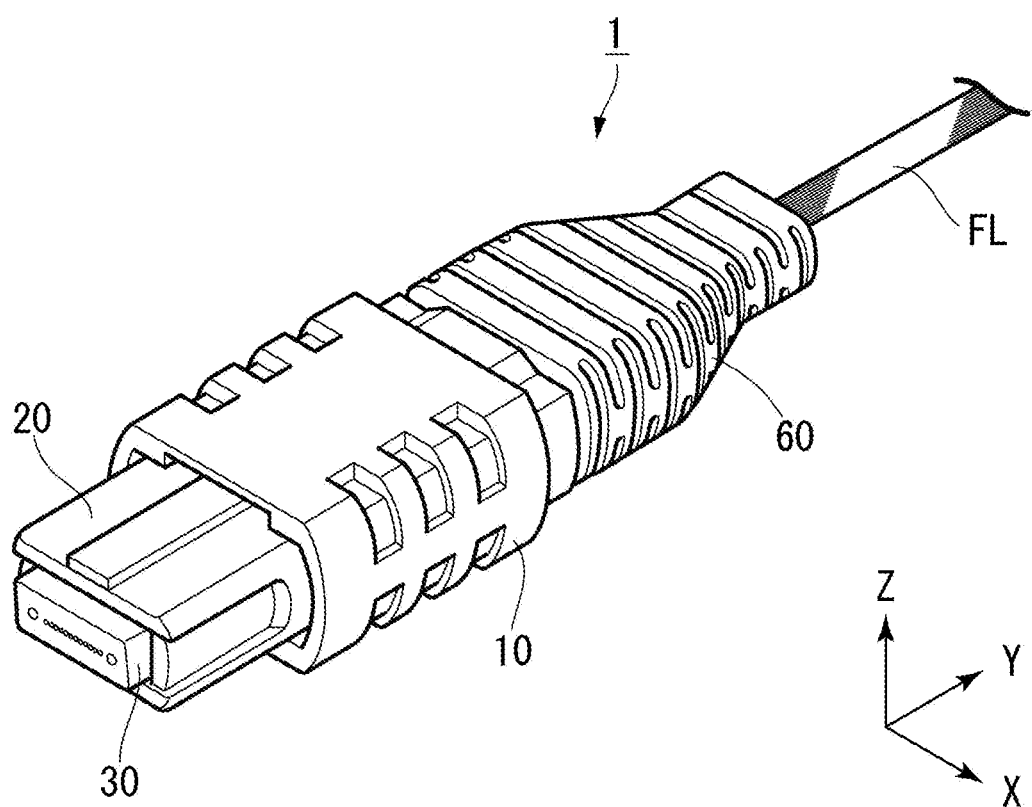
FIG. 1 is a perspective view showing an optical connector according to one or more embodiments of the present invention.

FIG. 1 is a perspective view showing an optical connector 1 according to one or more embodiments. The optical connector 1 includes an optical fiber pitch conversion jig (hereinafter, simply referred to as "jig") according to one or more embodiments.

Figure 2:
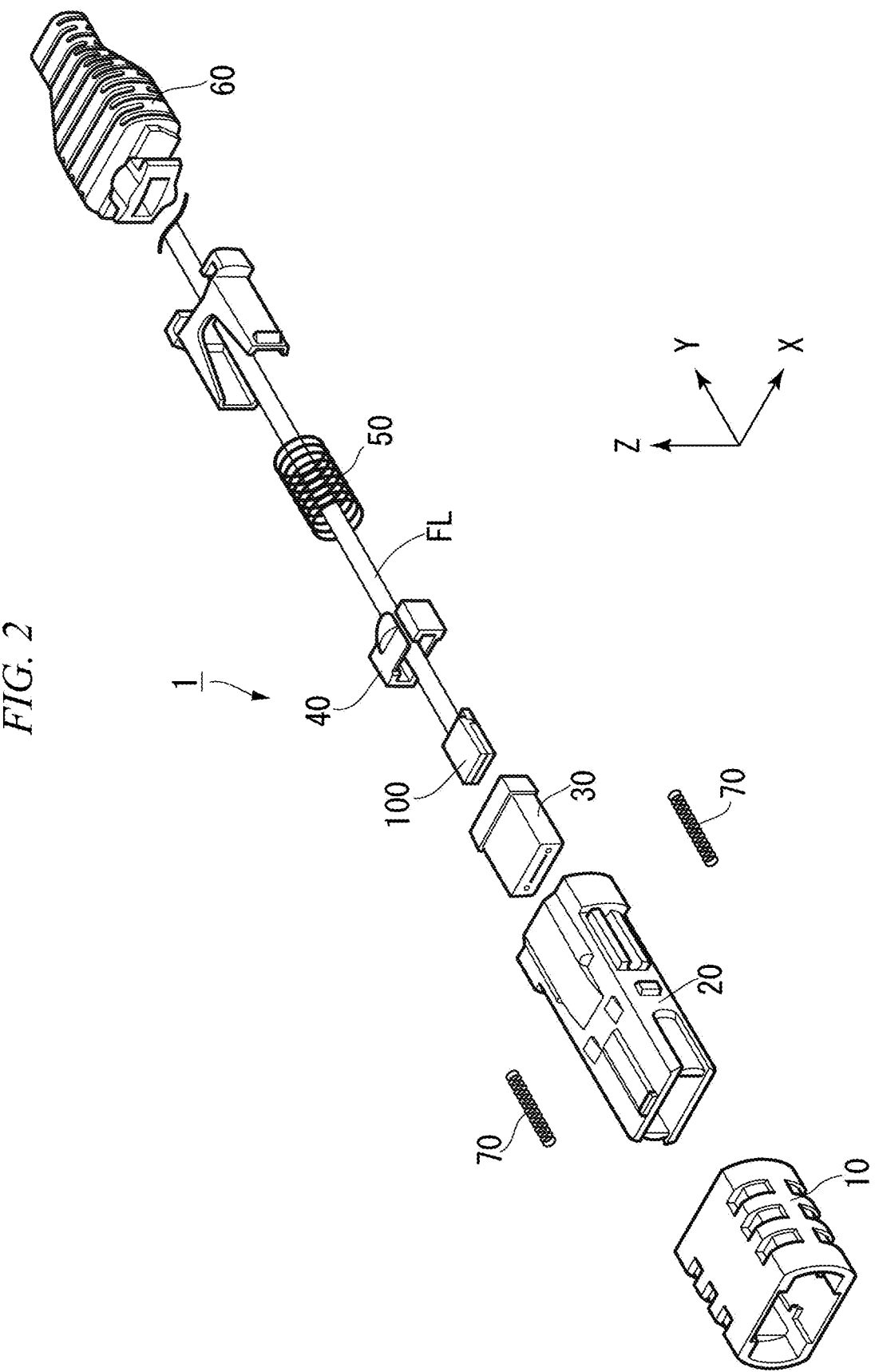
FIG. 2 is an exploded view showing the optical connector.

FIG. 2 is an exploded view of the optical connector 1. The optical connector 1 is a mechanically transferrable (MT)-type multi-core connector, and is also called a multi-fiber push-on (MPO) connector. Since the basic structure is known, the known configuration will be briefly described.

The optical connector 1 includes a pull-out member 10, a housing 20, a ferrule 30, a pin clamp 40, a first spring 50, a support portion 60, two second springs 70, and a jig 100. The ferrule 30, the pin clamp 40, and the first spring 50 are disposed in the housing 20. The pull-out member 10 and the second springs 70 are disposed outside the housing 20.

(Direction Definition)

In one or more embodiments, the XYZ Cartesian coordinate system is set and the positional relationship between components is described. The X-axis direction is the direction in which a plurality of optical fibers are arranged inside the optical connector 1. The Y-axis direction is the direction in which the optical fiber extends inside the optical connector 1. The Z-axis direction is a direction orthogonal to both the X-axis direction and the Y-axis direction. Hereinafter, the X-axis direction is referred to as a lateral direction X, the Y-axis direction is referred to as a longitudinal direction Y, and the Z-axis direction is referred to as an up-down direction Z. In the longitudinal direction Y, the side on which the ferrule 30 is located is referred to as a front side, and the side on which the support portion 60 is located is referred to as a rear side.

The fiber ribbon FL has entered the inside of the housing 20 from a side closer to the support portion 60. The fiber ribbon FL has a plurality of optical fibers arranged at a first pitch P1. Each optical fiber has a bare fiber and a coating covering the bare fiber. The fiber ribbon FL has a configuration in which coatings of the plurality of optical fibers are connected to each other. For example, the coatings of the plurality of optical fibers may be connected by a resin. Further, the coating covering the bare fiber (also referred to as a first coating) and the coating for connecting the plurality of optical fibers (also referred to as a second coating) may be formed separately so as to be detachable from each other, but may be integrally formed.

Although the details will be described later, the number of insertion holes formed in the ferrule 30 is the same as the number of optical fibers included in the fiber ribbon FL, and the pitch of the insertion holes in the lateral direction X is a second pitch P2 that is larger than the first pitch P1.

Figure 3:
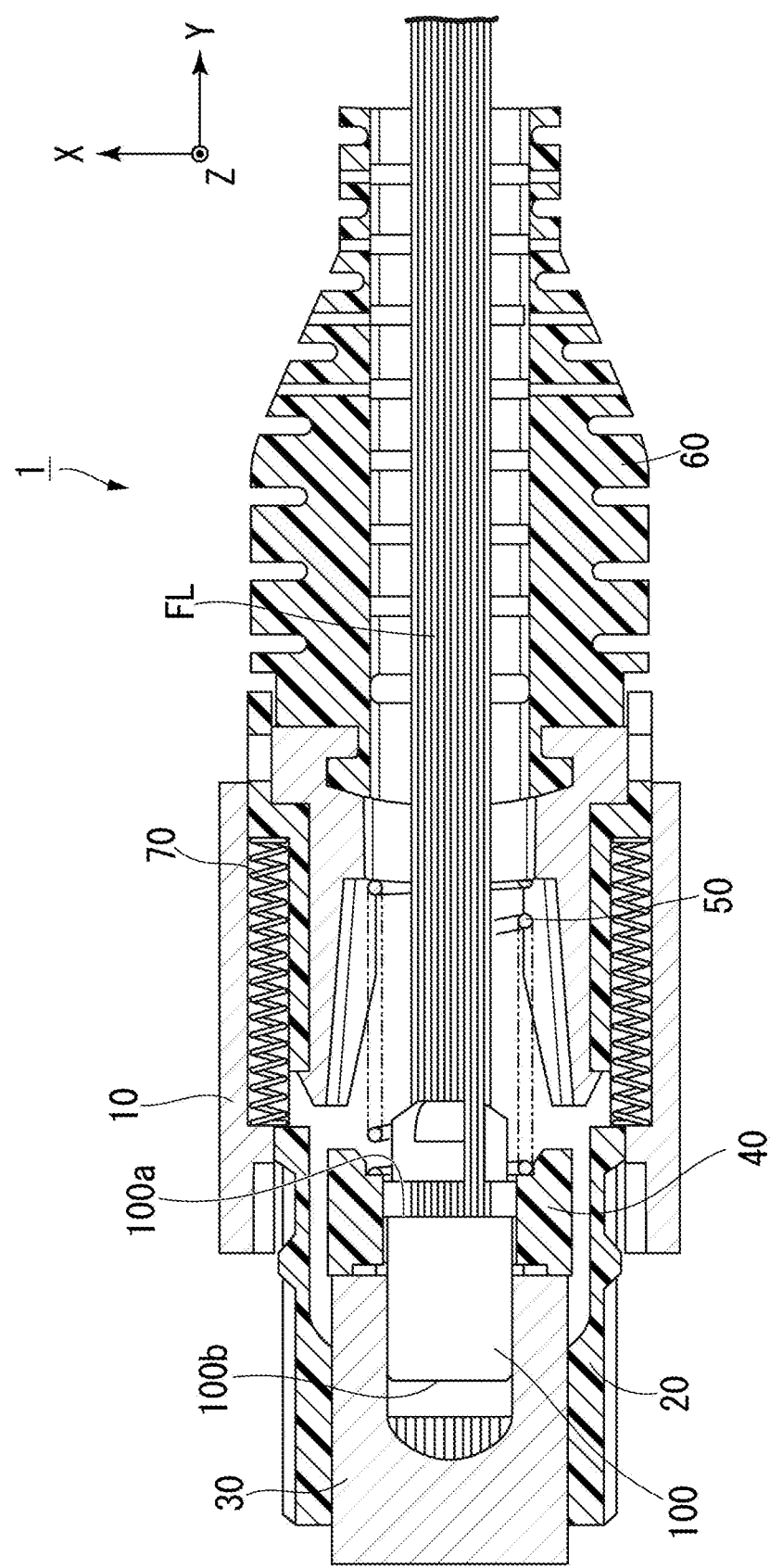
FIG. 3 is a cross-sectional view of the optical connector.

FIG. 3 shows a cross-sectional view of the optical connector 1. The jig 100 is disposed inside the housing 20. The jig 100 has a first end 100a located on the rear side of the optical connector 1 and a second end 100b located on the front side of the optical connector 1. The second end 100b has entered the ferrule 30.

The fiber ribbon FL is disposed so as to penetrate the jig 100 from the first end 100a side, in a state where connections among the tip portions of the plurality of optical fibers are disconnected. On the side closer to the first end 100a, the pitch of each optical fiber is the first pitch P1. The fiber ribbon FL protrudes toward the side closer to the second end 100b in a state where the pitch of each optical fiber is the second pitch P2. That is, the optical fiber of the fiber ribbon passes through the jig 100, so that the pitch of the optical fiber in the lateral direction X is converted from the first pitch P1 to the second pitch P2.

Each optical fiber protruding from the jig 100 has entered the insertion hole of the ferrule 30 in the state of a bare fiber obtained by removing the coating (first coating).

Figure 4:
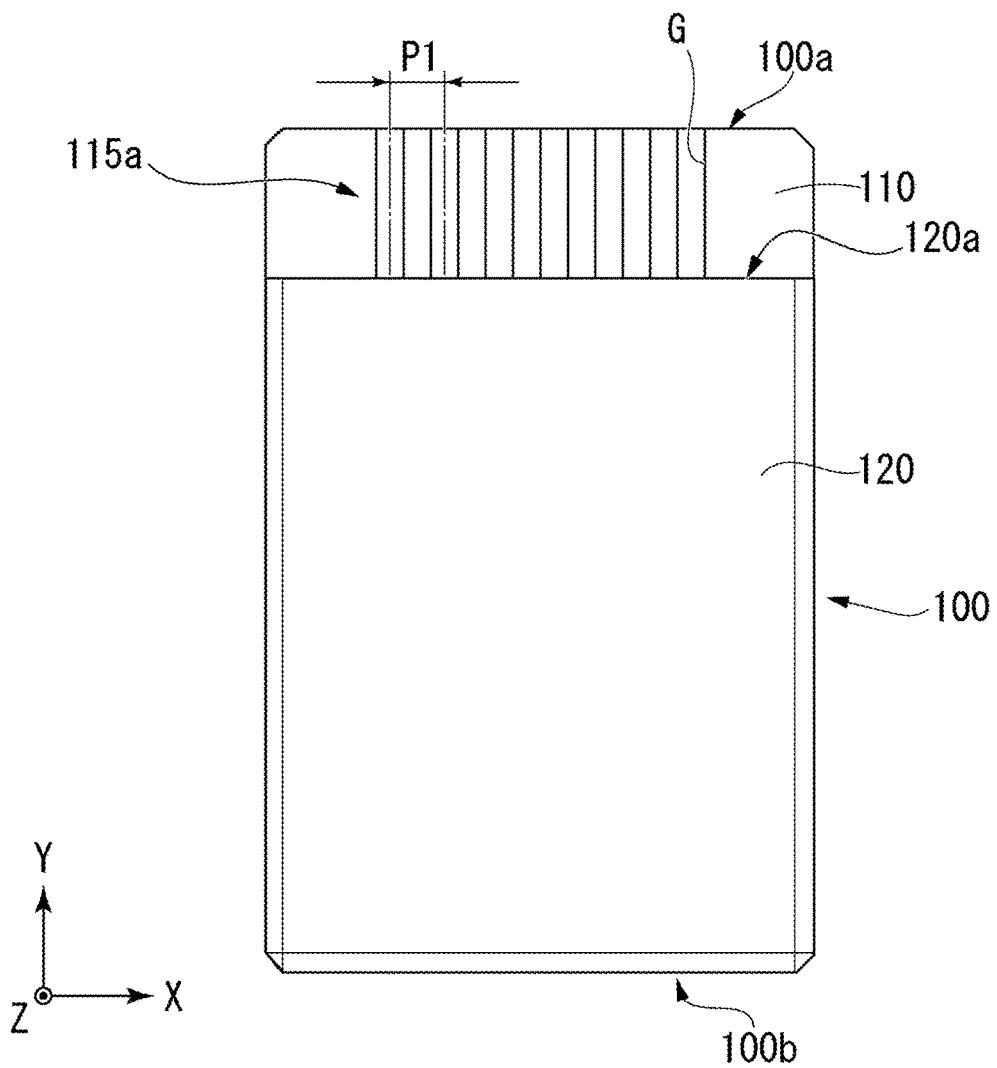
FIG. 4 is a plan view of an optical fiber pitch conversion jig disposed in the optical connector.
Figure 5:
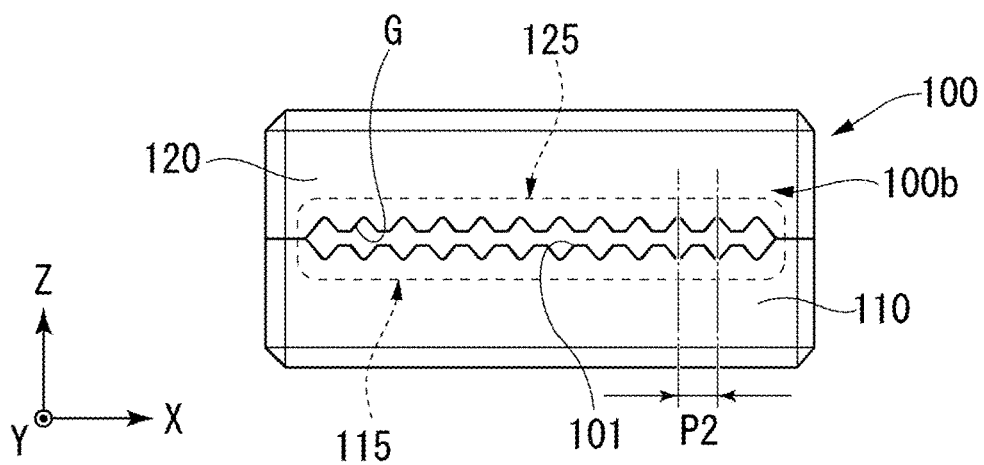
FIG. 5 is a front view of the optical fiber pitch conversion jig.
Figure 6:
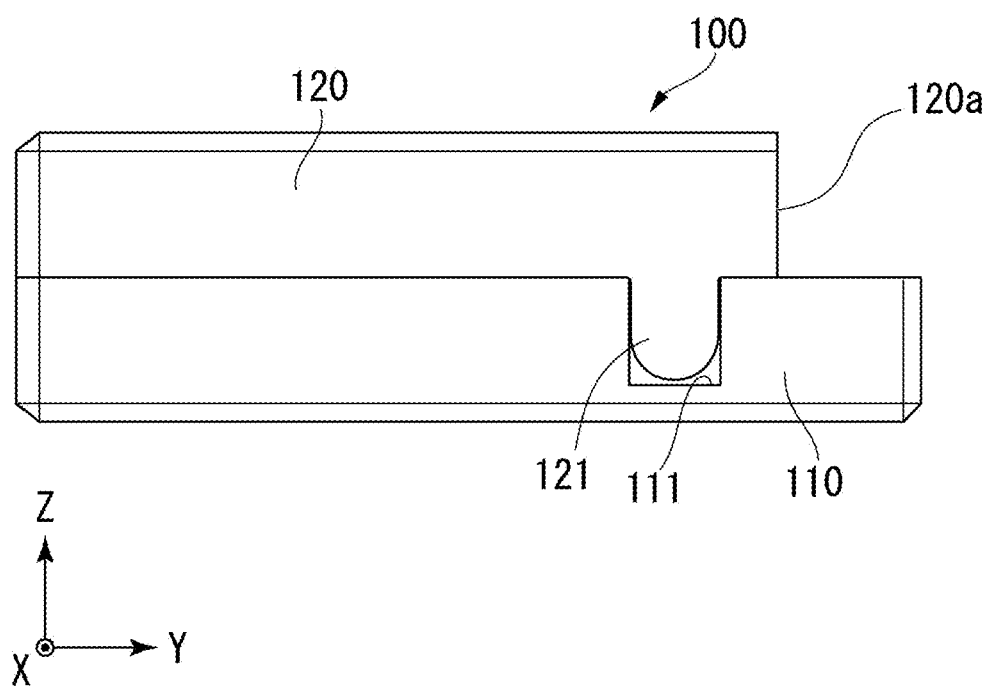
FIG. 6 is a right side view of the optical fiber pitch conversion jig.

FIG. 4 is a plan view of the jig 100. FIGS. 5 and 6 are a front view and a right side view of the jig 100, respectively. The jig 100 has a groove portion in which a plurality of grooves G are formed. The jig 100 has a first member 110 disposed on the lower side and a second member 120 disposed on the upper side. The first member 110 and the second member 120 have a groove portion 115 and a groove portion 125, respectively. Further, the groove G may be formed so as to be divided into the first member 110 and the second member 120.

Figure 7:
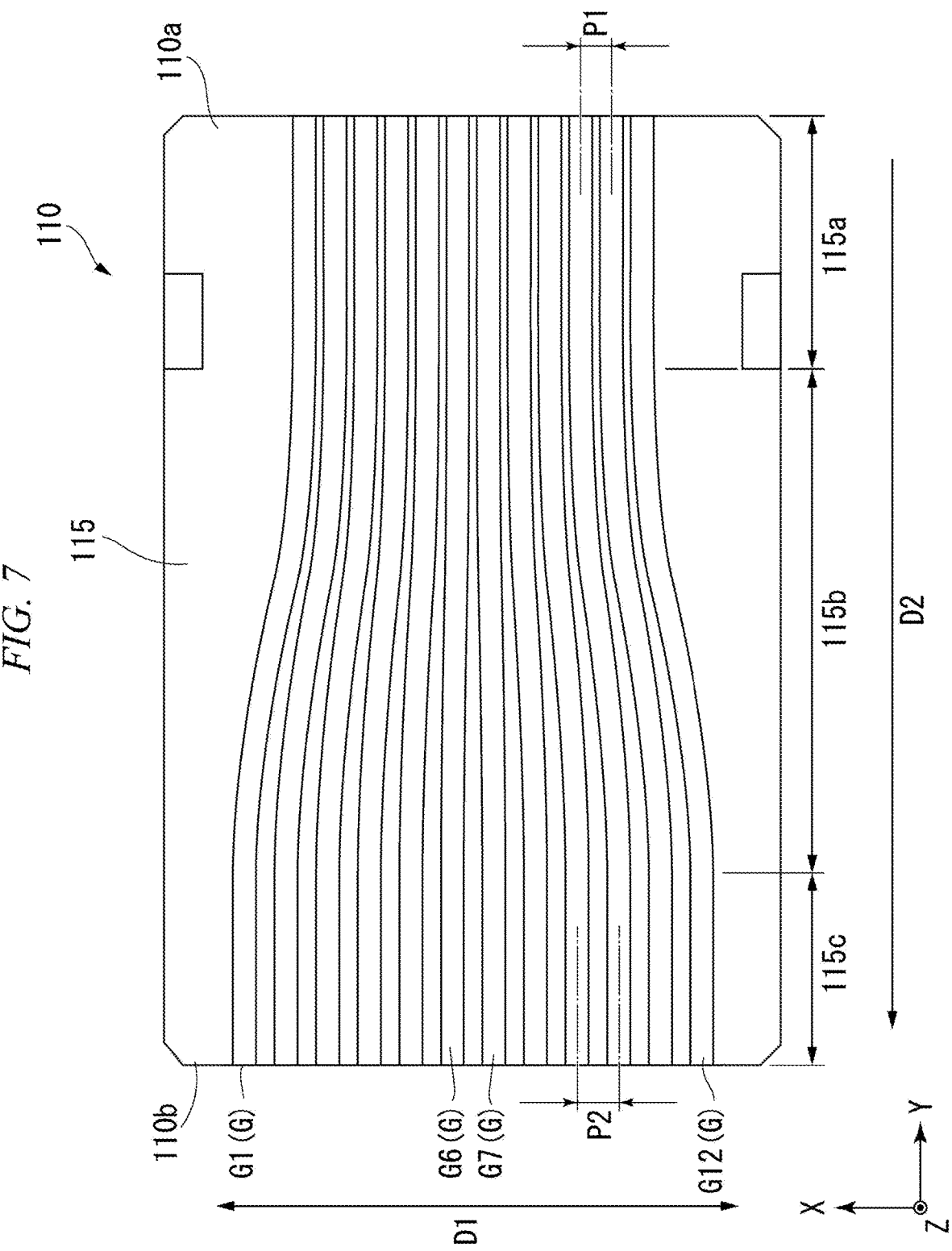
FIG. 7 is a diagram showing a first member of the optical fiber pitch conversion jig.

FIG. 7 is a diagram showing the first member 110 seen from above. The groove portion 115 having a plurality of grooves G is formed on the upper surface of the first member 110. The twelve grooves G are disposed along an alignment direction D1. Each groove G extends in an insertion direction D2. When disposing the jig 100 inside the optical connector 1, the second end 100b side is disposed on the front side of the optical connector 1, and the alignment direction D1 and the lateral direction X may be the same direction, and the insertion direction D2 and the longitudinal direction Y may be the same direction. Each groove G in the groove portion 115 extends from the first end 110a of the first member 110 to the second end 110b.

In the groove portion 115, the pitch of each groove G at the first end 110a is the first pitch P1, and the pitch of each groove G at the second end 110b is the second pitch P2.

Each groove G in the groove portion 115 extends linearly while holding the first pitch P1, in a predetermined length range in the insertion direction D2 from the first end 110a. After that, each of the grooves G is curved, so that the pitch gradually widens and the pitch becomes a second pitch P2. After that, each groove G linearly extends to the second end 110b while holding the second pitch P2.

According to the above aspect of each groove G, the groove portion 115 has three regions of a first linear part 115a, a pitch change part 115b, and a second linear part 115c from the side closer to the first end 110a along the insertion direction D2.

The number of grooves G in the groove portion 115 can be appropriately determined. In one or more embodiments, the groove portion 115 has 12 grooves G.

When viewed from the up-down direction, the curvature of each groove G in the pitch change part 115b is the smallest in the grooves G6 and G7 located at the center in the alignment direction D1 (the radius of curvature is large) and is the largest in the grooves GI and G12 located at both ends in the alignment direction D1 (the radius of curvature is small). That is, the radius of curvature of each groove G in the pitch change part 115b gradually decreases from the center in the alignment direction D1 toward both ends of the alignment direction D1.

When the number of grooves G is odd, the groove G at the center in the alignment direction D1 may be linear over the entire length in the insertion direction D2 including the pitch change part 115b.

The length of the first linear part 115*a* in the insertion direction D2 may be one-third or greater of the sum of the lengths of the three regions, in the insertion direction D2, that include the first linear part 115*a*, the pitch change part 115*b*, and the second linear part 115*c*. That is, the length of the first linear part 115*a* in the longitudinal direction Y may be one-third or greater of the length of the jig 100 in the longitudinal direction Y.

The smallest radius of curvature of the pitch change part 115*b* may be set to a value equal to or greater than an allowable bending radius of the applied optical fiber. The allowable bending radius is disclosed in a catalog or the like as an optical fiber specification, and can also be calculated based on the structural parameters of the optical fiber. For example, in an optical fiber having a refractive index difference Δn between the core and the cladding of 1.9% and a cladding diameter of 80 μm, the allowable bending radius is about 3 mm to 5 mm. The length of the pitch change part 115*b* in the insertion direction D2 connecting the first end 110*a* and the second end 110*b* can be appropriately set in consideration of realizing the above-described radius of curvature and the like.

The second linear part 115*c* is a part in which each optical fiber of the fiber ribbon FL whose pitch is converted by the pitch change part 115*b* is held in a straight line shape. Thus, when each optical fiber protrudes from the insertion hole 101 (see FIG. 5) of the jig 100, the tips are likely to maintain the pitch with each other, and it becomes easy to insert and fix the fiber to the ferrule 30.

On the lower surface of the second member 120 (the facing surface of the first member 110), the groove portion 125 (see FIG. 5) is formed in which a groove having the same aspect as the groove in the groove portion 115 is formed. The groove portion 125 of the second member 120 has only a pitch change part and a second linear part, and does not have a first linear part.

As shown in FIG. 6, the second member 120 has a fitting protrusion 121 extending downward. When the fitting protrusion is inserted into the fitting hole 111 provided in the first member 110, the first member 110 and the second member 120 are fitted to each other while being positioned, and as shown in FIG. 4, the groove portion 115 and the groove portion 125 face each other to form the jig 100.

In the jig 100 in which the first member 110 and the second member 120 are fitted, the first linear part 115*a* of the groove portion 115 is exposed without being covered by the second member 120 (see FIG. 4). As shown in FIG. 5, the second end 100*b* of the jig 100 has a plurality of insertion holes 101 arranged at the second pitch P2. In FIG. 5, the cross-sectional shape of each groove G (insertion hole 101) is rectangular, but may be other shapes. For example, the cross-sectional shape of each groove G may be circular. Further, a groove connecting portion shallower than the depths of the plurality of grooves G in the up-down direction Z when viewed from the longitudinal direction Y may be each formed among the grooves G.

In the manufacturing process of the optical connector 1, the tip portion of the fiber ribbon FL passed through the support portion 60 is inserted into the jig 100 from the first end 100*a* side.

When the fiber ribbon FL is inserted into the jig 100, the connection of coating (connection by the second coating) is disconnected over a certain length range at the tip portion of the fiber ribbon FL, and each optical fiber is not constrained by other optical fibers. After that, when the tip portion of the fiber ribbon FL is brought into contact with the first linear part 115*a* of the groove portion 115 and is advanced toward the second end 100*b* along the first linear part 115*a*, each optical fiber is advanced along the first linear part 115*a*.

When the fiber ribbon FL is further pushed forward, each optical fiber enters the groove portion 115 in the jig 100 from the first end 120*a* of the second member 120. The pitch is gradually widened by advancing each optical fiber in the groove portion 115 along the pitch change part 115*b*, and the pitch of each optical fiber becomes the second pitch P2 in the second linear part 115*c*. When the fiber ribbon FL is further advanced, each optical fiber aligned at the second pitch P2 protrudes from the insertion hole 101 at the second end 100*b* of the jig 100.

After that, the tip portion of each optical fiber is made into a bare fiber, the bare fiber and the jig 100 are inserted into the ferrule 30, and the bare fiber is inserted into the insertion hole of the ferrule 30. After that, an adhesive or the like is supplied into the ferrule 30 to fix the optical fiber and the jig 100.

After that, when each part is assembled, the optical connector 1 is completed.

As described above, in the jig 100 according to one or more embodiments, by simply inserting, from a side closer to the first end 100*a*, the fiber ribbon FL in which the interconnection of the tip portions is disconnected, it is possible to easily convert the alignment pitch of the optical fibers to the second pitch P2, and to make the optical fibers protrude from a side closer to the second end 100*b*. Therefore, by disposing the jig 100 inside the optical connector 1, the pitch conversion of the optical fibers can be easily performed inside the connector.

Since the groove portion 115 includes a first linear part 115*a* in which the plurality of grooves G are arranged at the first pitch P1, the pitch of the plurality of optical fibers of the fiber ribbon FL before being inserted into the jig is substantially the same as that of the first linear part 115*a*. As a result, the fiber ribbon FL in which interconnection is disconnected can be inserted into the jig 100 without adjusting the pitch among the optical fibers, and thus the insertion operation is simple.

Further, since the inserted optical fibers enter the pitch change part 115*b* via the first linear part 115*a*, the inserted optical fibers can smoothly advance in the groove even in a soft optical fiber having a small diameter (for example, a cladding diameter (the diameter of the bare fiber) of 100 μm or less), as compared with the case where there is a curved portion immediately after entering the groove portion.

In particular, the length of the first linear part 115*a* in the longitudinal direction Y may be one-third or greater of the length of the jig 100 in the longitudinal direction Y (dimension in the insertion direction D2). Thus, since the optical fiber enters the pitch change part 115*b* in a state where the force applied to the fiber insertion is concentrated in one direction by the first linear part 115*a*, dispersion of the insertion vector in directions other than the extending direction of each groove G is minimized, and the insertion becomes smoother.

Further, since the upper portion of the first linear part 115*a* is open, the tip portion of the fiber ribbon FL can be brought closer to the groove portion 115 from above the first linear part 115*a*, and each optical fiber can be easily aligned with the groove portion 115. This makes it possible to easily install the tip portion of the fiber ribbon FL on the jig 100. Further, by abutting the tip portion of the fiber ribbon FL against the groove portion 115 and aligning the tip portion with the groove portion 115, it becomes possible to smoothly insert the fiber ribbon into the insertion hole 101, as compared with the case where the fiber ribbon FL is directly inserted into the narrow insertion hole 101.

In addition, since a minimum radius of curvature of a curve of the groove G in the pitch change part 115b is equal to or greater than the allowable bending radius of the inserted optical fiber, there is little or small enough to be ignored optical transmission loss, in the optical fiber located in the jig 100. Therefore, the pitch can be converted without causing a transmission loss. Further, since the groove G of the pitch change part 115b is gently curved, it is possible to suppress the optical fiber from being caught or broken at the pitch change part 115b.

In one or more embodiments, the groove portion 125 of the second member 120 may have a first linear part. In this case, by making the length of the first linear part of the groove portion 125 in the longitudinal direction Y shorter than the length of the first linear part 115a in the longitudinal direction Y, a part of the first linear part 115a can be exposed in the same manner as in the above example.

Further, the lower surface of the second member 120 may be flat. That is, a plurality of grooves G may be formed only in the first member 110.

Figure 8:
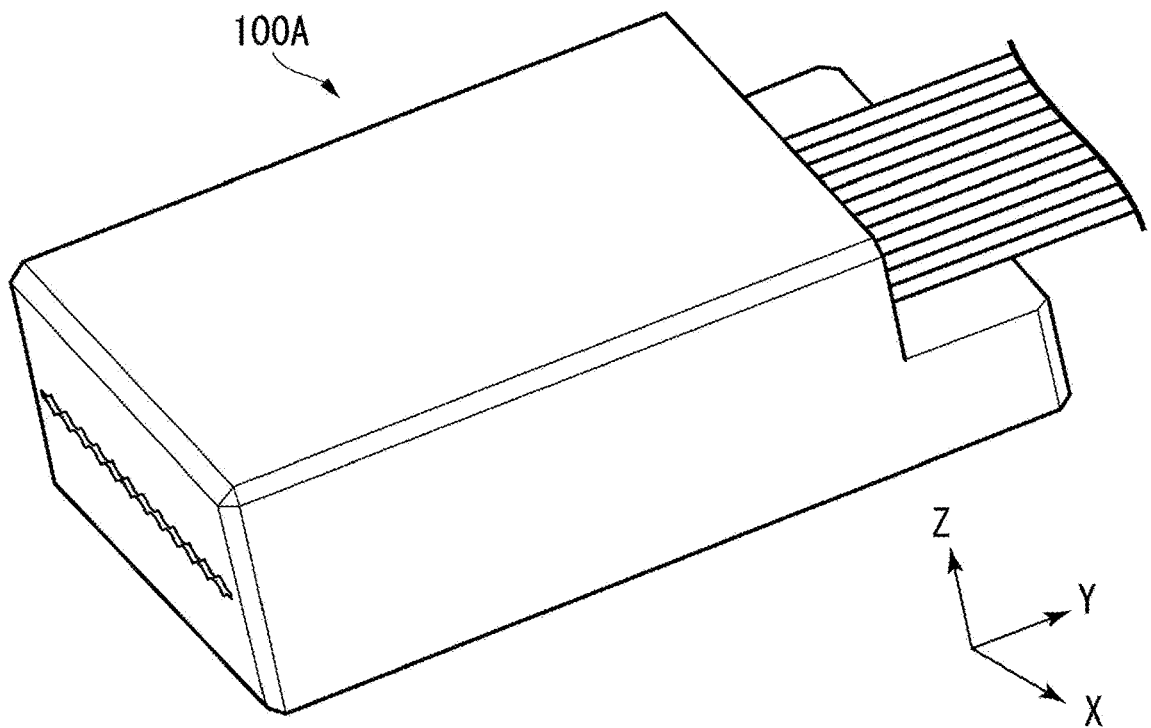
FIG. 8 is a diagram showing a modification example of the optical fiber pitch conversion jig.

In one or more embodiments, it is not essential that the jig is composed of the first member and the second member, and the jig may be formed as a single member as the jig 100A of the modification example shown in FIG. 8.

Second Example

One or more embodiments of the present invention will be described with reference to FIGS. 9 to 12. In the following description, the same reference numerals will be given to the configurations common to those already described, and duplicate description will be omitted.

Figure 9:
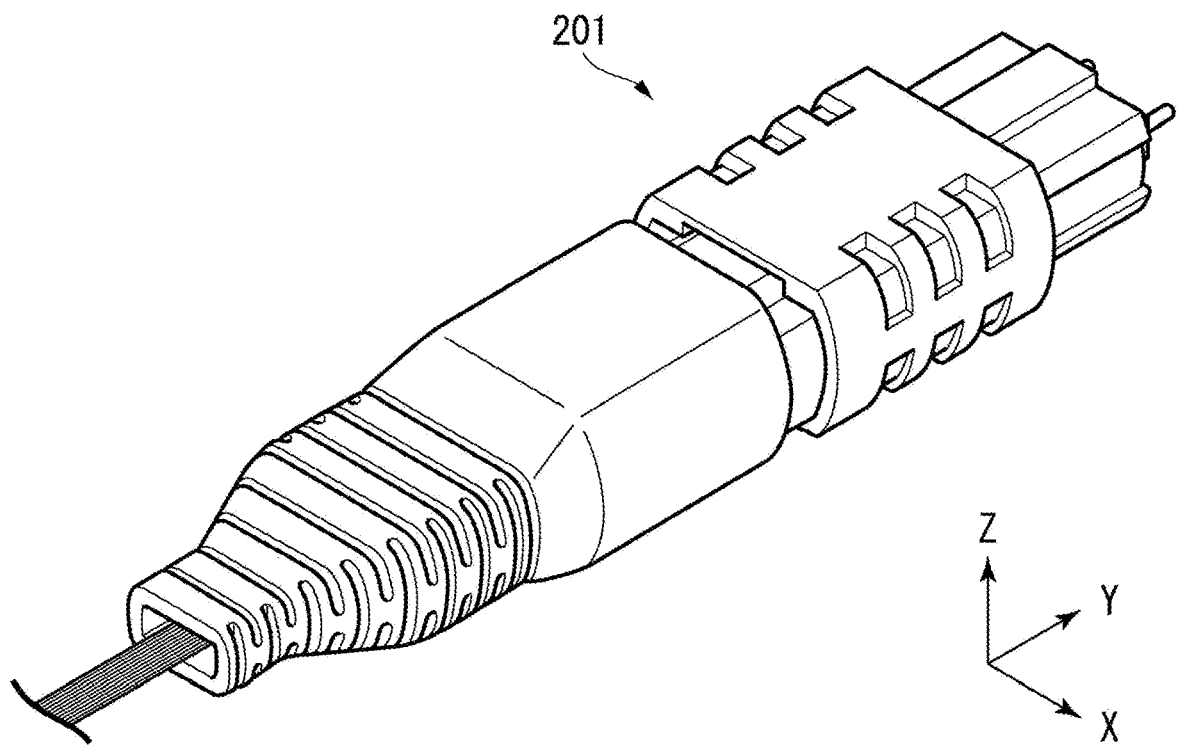
FIG. 9 is a perspective view showing an optical connector according to one or more embodiments of the present invention.

FIG. 9 is a perspective view showing an optical connector 201 of one or more embodiments. The optical connector 201 is a fused connector used by attaching a fiber ribbon FL prepared by a user. Since the basic structure of the fused connector is known, a part of the known configuration will be omitted.

Figure 10:
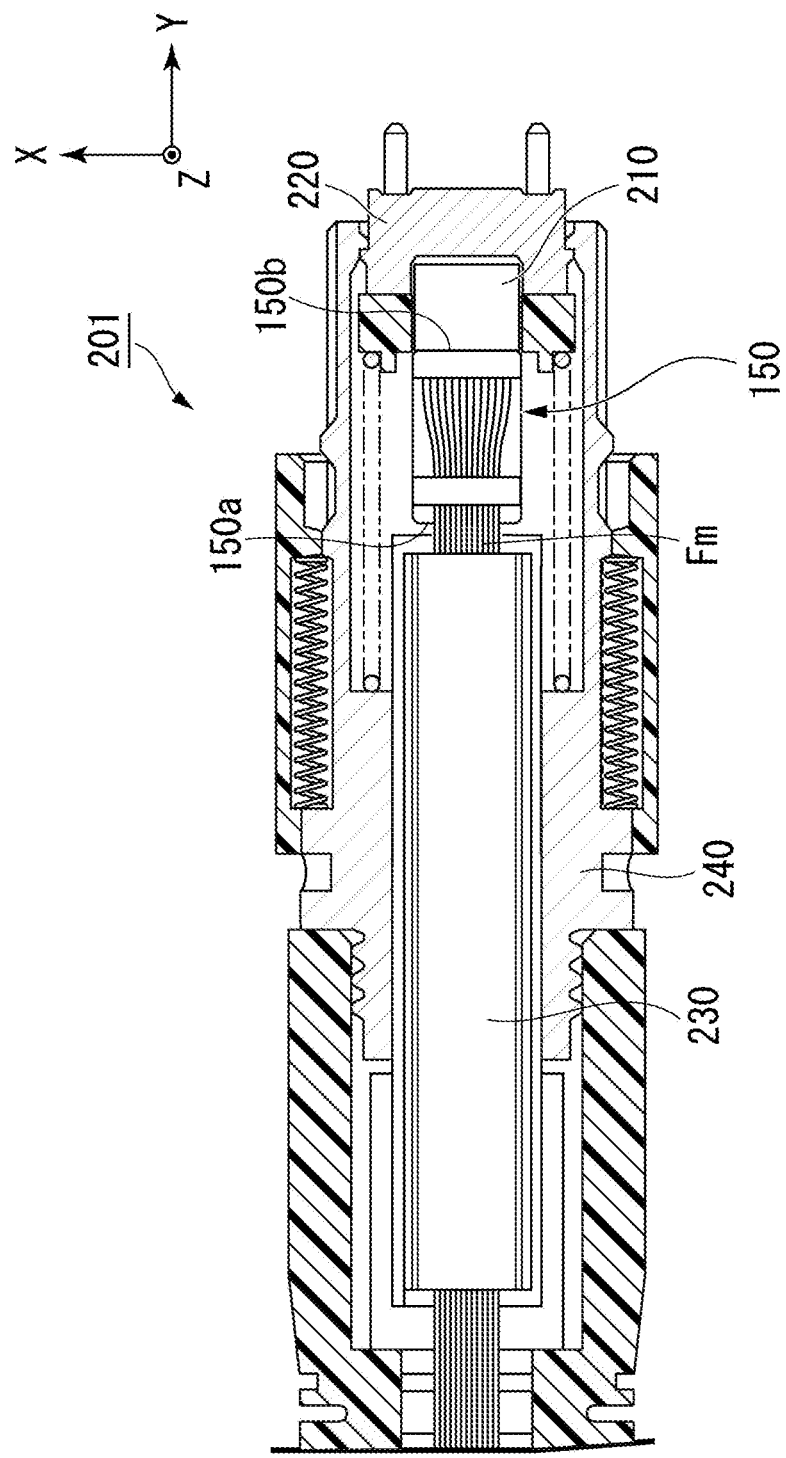
FIG. 10 is a cross-sectional view of the optical connector.

FIG. 10 is a cross-sectional view of the optical connector 201. The fused fiber Fm fused with the optical fiber prepared by the user is aligned at the first pitch P1. One end (ferrule-side end) of the fused fiber is inserted into the first end 150a of the optical fiber pitch conversion jig 150, the alignment pitch is converted to the second pitch P2, and the fused fiber protrudes from the second end 150b. The fused fiber protruding from the second end 150b enters the auxiliary boot 210 in which a plurality of linear insertion holes are arranged at the second pitch P2, and the fused fiber protruding from the auxiliary boot 210 enters the insertion hole of the ferrule 220.

The coating (first coating) of the fused fiber Fm protruding from the second end 150b may be removed before entering the auxiliary boot 210 or before entering the ferrule 220.

The other end (fused-side end) of the fused fiber Fm is fused with the optical fiber prepared by the user, and then clamped by the mechanical clamp 230 and supported in the housing 240.

Figure 11:
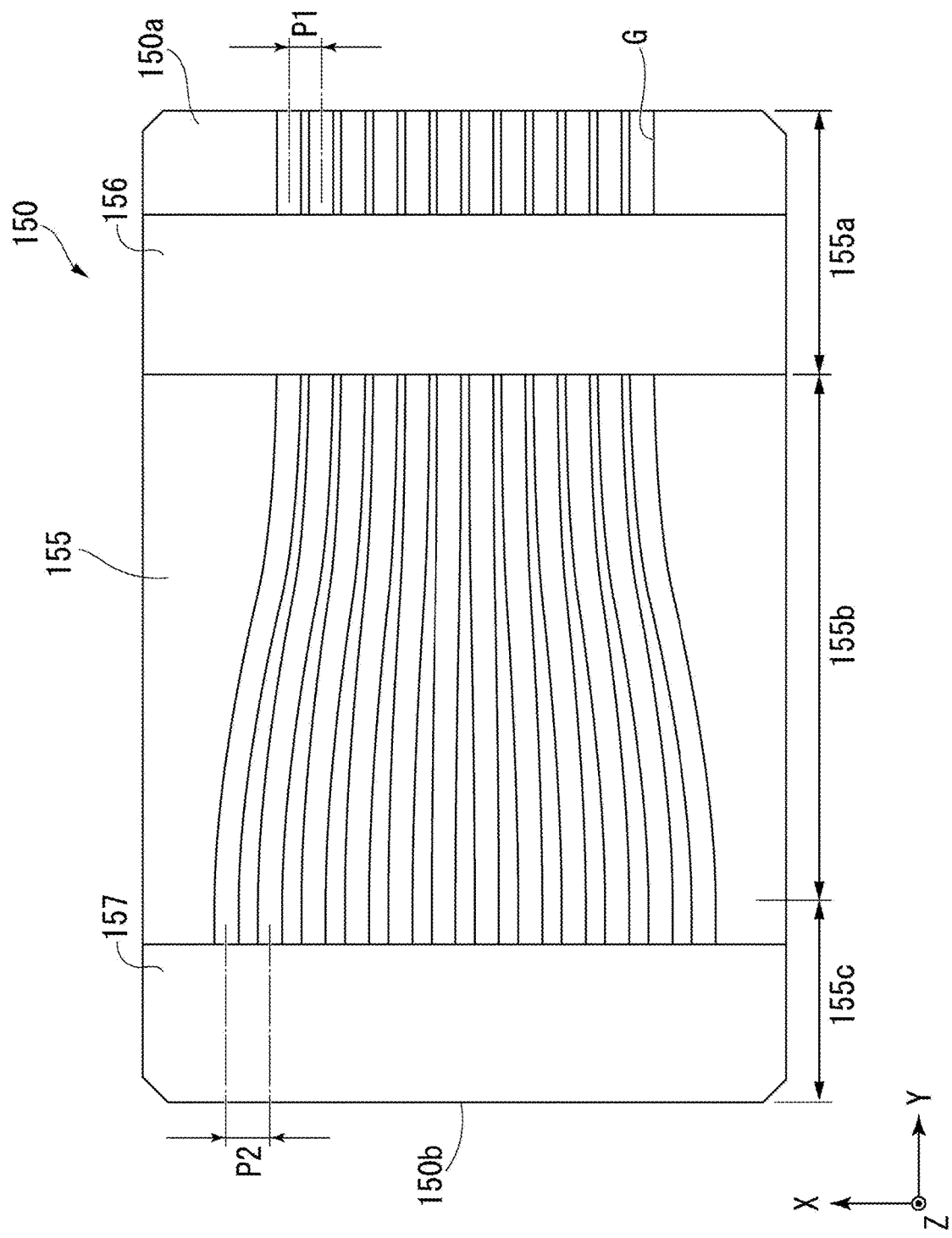
FIG. 11 is a diagram showing an optical fiber pitch conversion jig related to the optical connector.

FIG. 11 shows the jig 150 of one or more embodiments. The jig 150 is a single member, and has a groove portion 155 having a plurality of grooves G formed on the upper surface thereof. The aspect of the groove G in the groove portion 155 is substantially the same as the groove in the groove portion 115, and includes a first linear part 155a, a pitch change part 155b, and a second linear part 155c.

In each groove G of the groove portion 155, a part of the first linear part 155a and a part of the second linear part 155c are covered on the upper side to form a tunnel shape. Thus, the groove portion 155 has a first covering part 156 in the first linear part 155a and a second covering part 157 in the second linear part 155c.

In the longitudinal direction Y, the first covering part 156 is located at a position away from the first end 150a of the jig 150. Thus, the first linear part 155a of each groove G is maintained in a state in which the upper side is open within a certain range from the first end 150a.

The second covering part 157 reaches the second end 150b of the jig 150 and constitutes a part of the end surface of the second end of the jig 150.

Figure 12:
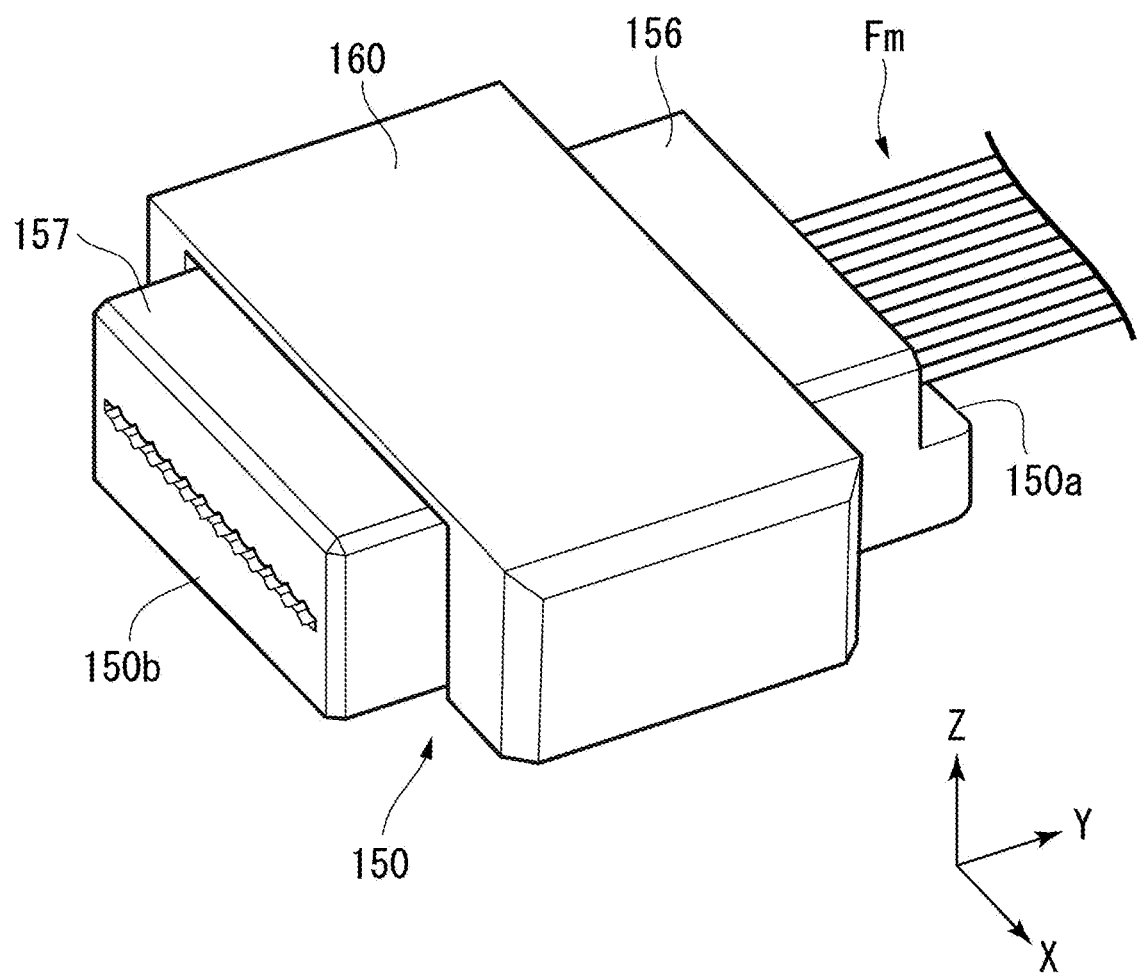
FIG. 12 is a diagram showing one process of pitch conversion using the optical fiber pitch.

When pitch conversion is performed by passing the fused fiber Fm through the jig 150, as shown in FIG. 12, the lid member 160 is disposed between the first covering part 156 and the second covering part 157 to cover the upper side of the groove portion 155. In this state, when the fused fiber Fm is inserted into the jig 150 from a side closer to the first end 150a, the pitch-converted fused fiber Fm protrudes from a side closer to the second end 150b. By disposing the lid member 160, the fused fiber Fm that has passed through the first covering part 156 is unlikely to be away from the groove portion 155, and the fused fiber Fm can be smoothly advanced in the groove portion 155 to be introduced into the tunnel of the second covering part 157.

The shape of the opposing groove may be formed on the lower surface of the lid member 160, but the lower surface may be flat.

In the optical connector 201 of one or more embodiments, to suppress an increase in the external dimensions of the connector while accommodating a mechanical clamp 230 or the like that reinforces the fusion point of the optical fiber in the housing, a ferrule 220 of which the dimension in the insertion direction, in which the optical fiber is inserted, is shorter than the ferrule 30 is used. In the optical connector 201, the fused fiber Fm, which is pitch-converted by the jig 150, is passed through the auxiliary boot 210 and then introduced into the ferrule 220, thereby improving the stability of the connection with the ferrule 220.

Since the jig 150 of one or more embodiments is composed of a single member, it is possible to easily manufacture the jig 150 and the connector using the jig 150. When assembling the connector using the jig 150, the lid member 160 may be used as described above, but since the lid member 160 is used only in a connector assembling process, the number of the lid member 160 to be manufactured is much smaller than that of number of the jig 150 itself.

In one or more embodiments, the jig 100 may be used instead of the jig 150. Similarly, the jig 150 may be used for the optical connector 1.

Third Example

One or more embodiments of the present invention will be described with reference to FIGS. 13 to 15. In one or more embodiments, a pitch conversion cord or the like using the optical fiber pitch conversion jig will be described.

Figure 13:
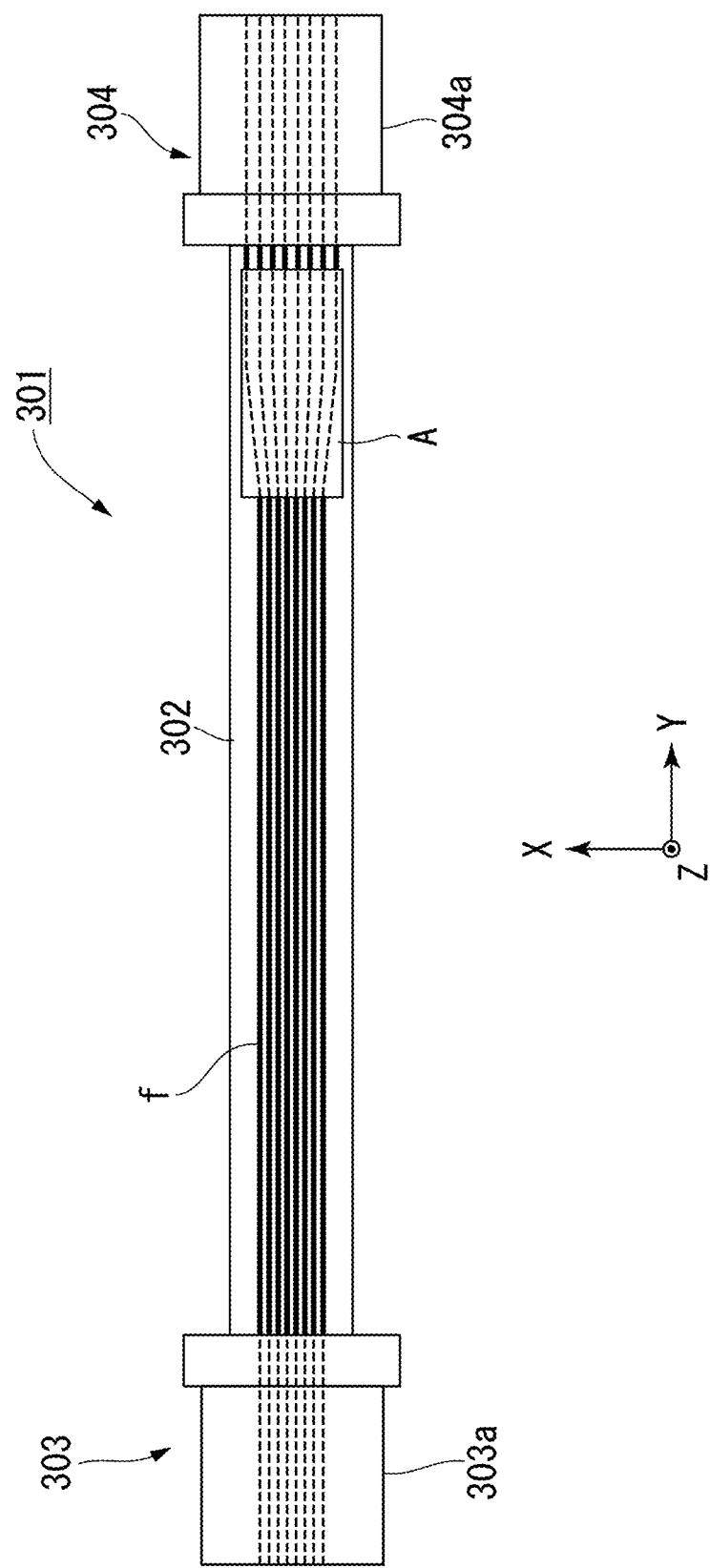
FIG. 13 is a schematic diagram showing a pitch conversion cord according to one or more embodiments of the present invention.

FIG. 13 shows a schematic diagram of a pitch conversion cord 301 according to one or more embodiments. The pitch conversion cord 301 includes a cord body 302, and a first pitch end 303 and a second pitch end 304 disposed at both ends of the cord body 302.

A plurality of optical fibers fare passed through the cord body 302. The first pitch end 303 has a first ferrule 303a having a plurality of insertion holes arranged at the first pitch P1, and is configured to be connectable to another optical connector or the like. The second pitch end 304 has a second ferrule 304a having a plurality of insertion holes arranged at the second pitch P2, and is configured to be connectable to another optical connector or the like.

The first end of each optical fiber f is inserted and fixed in the first ferrule 303a. The second end of each optical fiber f passes through the optical fiber pitch conversion jig A, and is inserted and fixed in the second ferrule 304a in a state of being converted to the second pitch P2. As the optical fiber pitch conversion jig A, any of the above-described jigs 100 and 150 can be used.

In the pitch conversion cord 301 of one or more embodiments, two fiber cables having different pitches can be easily optically connected, by connecting a fiber cable or the like having the first pitch P1 to the first pitch end 303 and connecting a fiber cable or the like having the second pitch P2 to the second pitch end 304.

In the pitch conversion cord 301, the plurality of optical fibers f disposed in the cord body 302 do not necessarily need to be connected in an aligned state, and the pitch conversion cord 301 can be efficiently manufactured by using the fiber ribbon in which the coatings are connected to each other at the first pitch P1.

Figure 14:
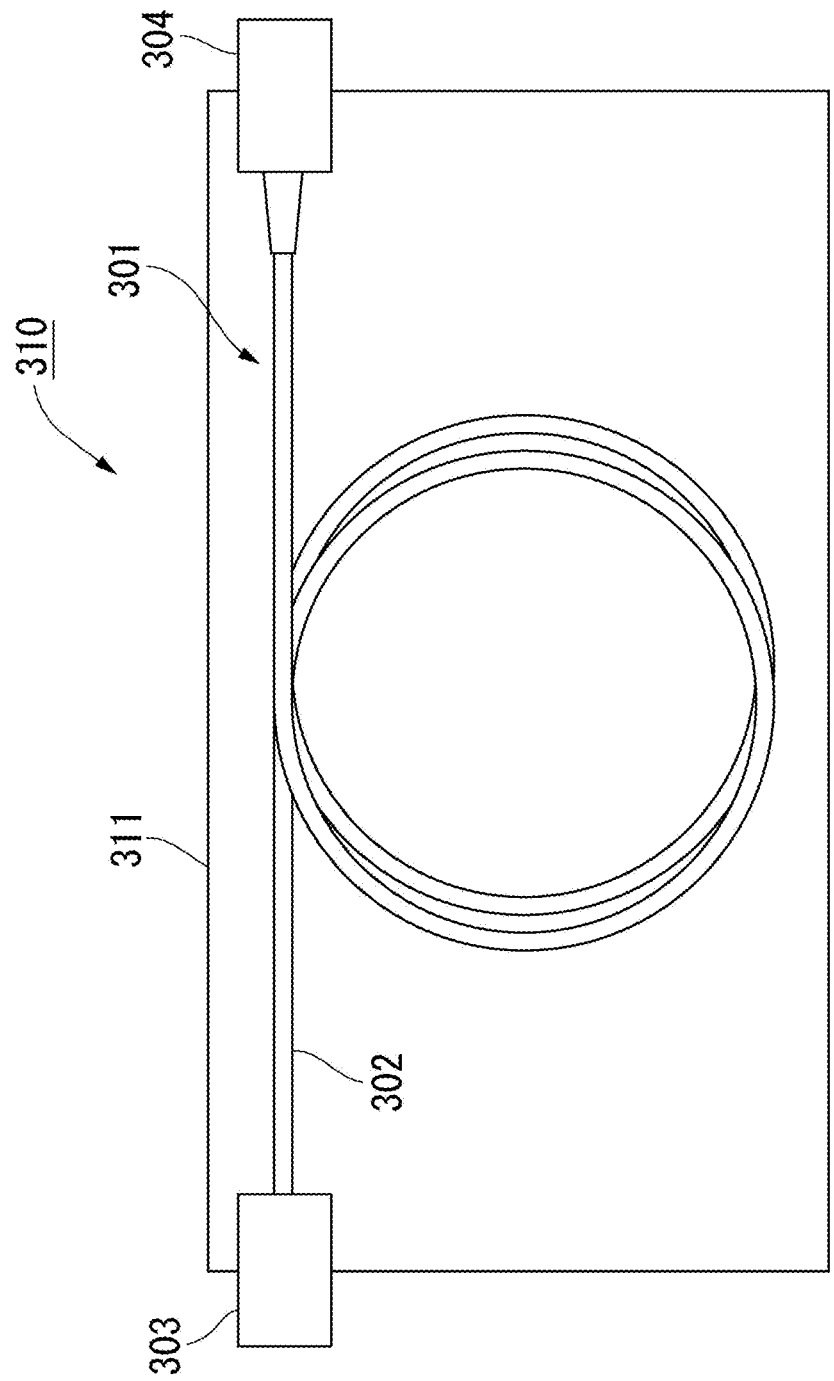
FIG. 14 is a schematic diagram showing an optical conversion box using the pitch conversion cord.
Figure 15:
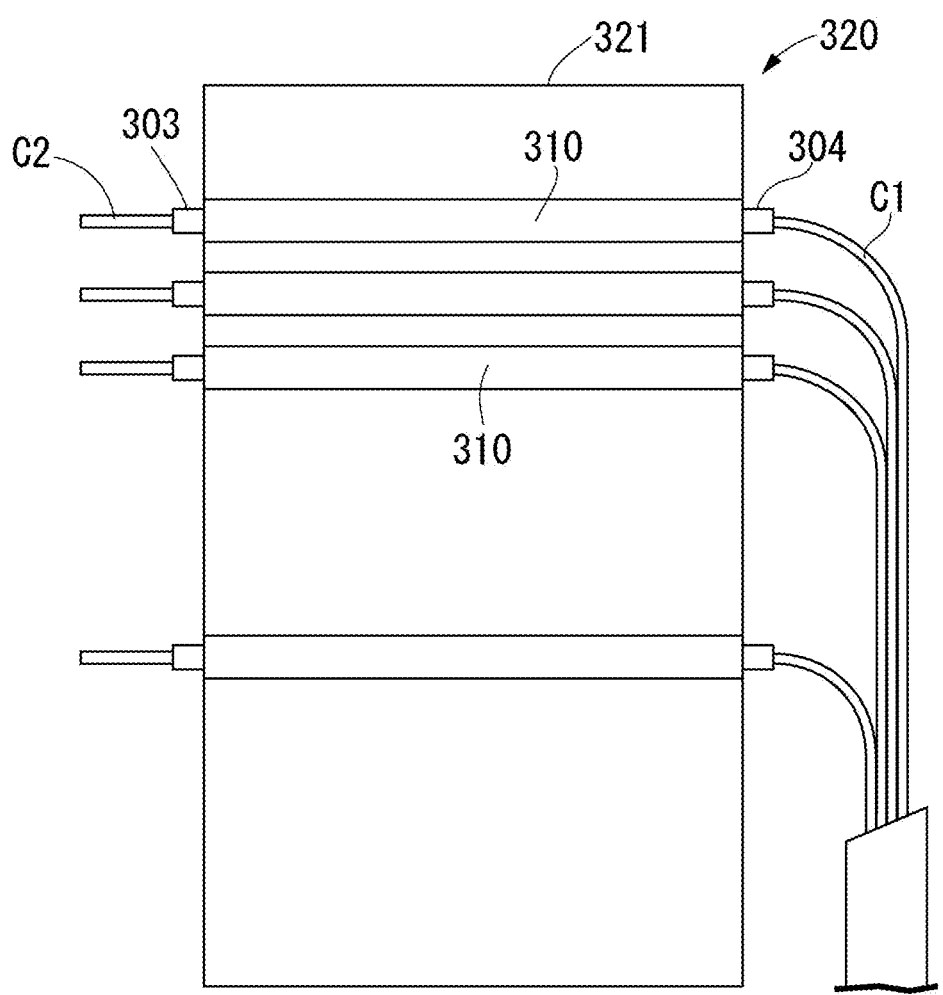
FIG. 15 is a schematic diagram showing an optical conversion rack using the optical conversion box.

FIG. 14 shows a schematic diagram of an optical conversion box 310 having a pitch conversion cord 301, and FIG. 15 shows a schematic diagram of an optical conversion rack 320 having a plurality of the optical conversion boxes 310.

The optical conversion box 310 has a housing 311. The first pitch end 303 and the second pitch end 304 of the pitch conversion cord 301 are fixed to the outer surface of the housing 311, and the cord body 302 is disposed inside the housing 311. In the optical conversion box 310, the positions of the first pitch end 303 and the second pitch end 304 are stable, and the connection work becomes easy.

FIG. 14 shows an example in which the length of the cord body 302 is longer than the dimension of the housing 311. When the cord body 302 is longer than the dimension of the housing 311, there is an advantage that the maintainability of the optical conversion box 310 is improved, but this is not essential. The cord body 302 may be long enough to be disposed without slack between the first pitch end 303 and the second pitch end 304.

As shown in FIG. 15, the optical conversion rack 320 has a gantry 321 and has a structure in which the plurality of optical conversion boxes 310 are disposed on the gantry 321. By using the optical conversion rack 320, it is possible to connect a large number of sets of the cable C1 of the first pitch P1 and the cable C2 of the second pitch P2 together, which may be used when applied to a data center or the like.

Although one or more embodiments of the present invention have been described in detail with reference to the drawings, the specific configuration is not limited to these embodiments, and changes and combinations of configurations within a range not deviating from the gist of the present invention are also included. Some changes are illustrated below, but not all, and other changes are possible. These changes can be applied to any embodiments, and two or greater may be appropriately combined.

The width of some grooves G in the groove portion may be larger than the width of the other grooves G. For example, the groove width of the first groove, which is a part of the plurality of grooves G, may be larger than the groove width of the second groove other than the first groove among the plurality of grooves G.

In each of the above-described embodiments, the curve of the groove G is the sharpest in the pitch conversion part at both ends in the alignment direction, so that it is possible to reduce the catching of optical fibers, by increasing the width of the grooves G in a certain range from both ends (for example, the grooves G at both ends or two grooves G respectively from both ends) by, for example, about 10 μm. At this time, the groove width may be increased over the entire length of the groove G, or may be increased only at the curved pitch change part.

The second linear part may be shortened or omitted in the groove portion. Alternatively, instead of the second linear part, a member such as the auxiliary boot 210 described above may be prepared and disposed side by side with the jig.

The groove shape may be such that a plurality of grooves are arranged at equal intervals on the first end side and the second end side, and is not necessarily the symmetrical aspect shown in the above embodiments.

The jig may have transparency. In this case, the optical fiber advancing in the jig can be visually recognized, and workability is improved.

In the jig according to the present invention, in consideration of versatility, the number of grooves G in the groove portion may be set based on the maximum number of fibers expected to be applied. In this case, in the optical connector according to the present invention, the number of optical fibers passed through the jig may be less than the number of grooves G in the groove portion. At this time, the optical fibers do not necessarily need to be passed through the grooves G positioned at the center in the alignment direction. In the jig of the present invention, as long as the optical fibers are passed through a plurality of grooves G that are adjacent with each other in the alignment direction, pitch conversion can be performed regardless of which grooves accommodate the optical fibers.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1, 201: Optical connector
100, 100A, 150, A: Optical fiber pitch conversion jig
100a, 150a: First end
100b, 150b: Second end
110: First member
115, 155: Groove portion
115a, 155a: First linear part (linear part)
115b, 155b: Pitch change part
115c, 155c: Second linear part
120: Second member
156: First covering part
157: Second covering part
160: Lid member
301: Pitch conversion cord
310: Optical conversion box
G: Groove
P1: First pitch
P2: Second pitch
X: Lateral direction
Y: Longitudinal direction
Z: Up-down direction

What is claimed is:

1. An optical fiber pitch conversion jig for converting a pitch among optical fibers, the optical fiber pitch conversion jig comprising:
    a groove portion comprising:
        grooves extending from a first end of the optical fiber pitch conversion jig to a second end of the optical fiber pitch conversion jig;
        a first linear part on a side closer to the first end and in which a pitch among the grooves is a first pitch; and
        a pitch change part that is continuous with the first linear part and in which the pitch widens to a second pitch larger than the first pitch, wherein
    in the pitch change part, at least one of the grooves is curved,
    the pitch of the optical fibers is widened by inserting the optical fibers from the first end and making the optical fibers advance toward the second end, and
    in the pitch change part,
        a radius of curvature of each of the grooves gradually decreases from a center in a direction in which the grooves are disposed toward both ends of the direction, and
        a groove width of the grooves becomes larger as the radius of curvature is smaller.

2. The optical fiber pitch conversion jig according to claim 1, wherein the groove portion further comprises a second linear part that is continuous with the pitch change part, that extends to the second end, and in which the pitch is the second pitch.

3. The optical fiber pitch conversion jig according to claim 2, wherein a length of the first linear part is equal to or greater than one-third a total length of the optical fiber pitch conversion jig.

4. The optical fiber pitch conversion jig according to claim 1, wherein in the pitch change part a width of one of the grooves is larger than a width of another one of the grooves.

5. The optical fiber pitch conversion jig according to claim 1, wherein a minimum radius of curvature of a curve in the pitch change part is equal to or greater than an allowable bending radius of the optical fibers.

6. The optical fiber pitch conversion jig according to claim 1, further comprising:

a first member in which the groove portion is disposed; and
a second member that is fitted to the first member and covers the groove portion with the first member.

7. The optical fiber pitch conversion jig according to claim 6, wherein a part of the first linear part is exposed in a state where the second member is fitted to the first member.

8. The optical fiber pitch conversion jig according to claim 2, further comprising:
    a first covering part that covers a part of the first linear part; and
    a second covering part that covers a part of the second linear part.

9. An optical connector comprising the optical fiber pitch conversion jig according to claim 1.

10. A pitch conversion cord comprising the optical fiber pitch conversion jig according to claim 1.

11. An optical conversion box comprising the pitch conversion cord according to claim 10.

12. A pitch conversion method for optical fibers using the optical fiber pitch conversion jig according to claim 7, comprising:
    inserting the optical fibers disposed at the first pitch into the groove portion from a side closer to the first end along the part of the first linear part that is exposed; and
    converting the first pitch into the second pitch by pushing the optical fibers and by passing through the pitch change part.

13. A pitch conversion method for optical fibers using the optical fiber pitch conversion jig according to claim 8, comprising:
    covering the grooves between the first covering part and the second covering part with a lid;
    inserting the optical fibers disposed at the first pitch into the groove portion from a side closer to the first end; and
    converting the first pitch into the second pitch by pushing the optical fibers and by passing through the pitch change part.

14. The optical fiber pitch conversion jig according to claim 1, wherein the groove portion comprises three or more grooves.

* * * * *